United States Patent

Suzuki et al.

[15] 3,687,397

[45] Aug. 29, 1972

[54] TAPE CONTROL APPARATUS OF TAPE PROCESSING MACHINES

[72] Inventors: Akira Suzuki; Yoshiaki Esashi, both of Tokyo; Tsunemoto Nakanishi, Ichikawa, all of Japan

[22] Filed: April 6, 1970

[21] Appl. No.: 25,800

[30] Foreign Application Priority Data

April 12, 1969 Japan ......................44/28037

[52] U.S. Cl. .............242/191, 200/11 TW, 200/156, 235/103

[51] Int. Cl. .....B65h 59/38, G03b 1/02, G11b 15/13

[58] Field of Search..............242/181–191, 201–210; 235/103, 132; 352/172, 175; 313/129–136; 200/61.17, 61.18, 11 TW, 156

[56] References Cited

UNITED STATES PATENTS

| | | | |
|---|---|---|---|
| 2,943,804 | 7/1960 | Loewe et al. | ..............242/186 |
| 3,061,191 | 10/1962 | Hultgren | ...............200/11 TW |

*Primary Examiner*—Leonard D. Christian
*Attorney*—Chittick, Pfund, Birch, Samuels & Gauthier

[57] ABSTRACT

Control apparatus for a tape processing machine comprises a first integrating counter resetable to zero and including a first switch contact operable when all digit wheels of the counter are shifted from 0 to 9, a second resetable counter including a second switch contact operable when all digit wheels of the second counter are shifted from 9 to 0 or vice versa, means to interlock the first and second counters with the running of the tape to memorize a predetermined position of the tape by the reset operation of the counters and a control circuit for the tape driving mechanism controlled by the first and second switch contact.

6 Claims, 8 Drawing Figures

AKIRA SUZUKI
YOSHIAKI ESASHI
TSUNEMOTO NAKANISHI
INVENTORS

BY Chittick, Pfund, Birch, Samuels & Gauthier
ATTORNEY

AKIRA SUZUKI
YOSHIAKI ESASHI
TSUNEMOTO NAKANISHI
INVENTORS

BY Chittick, Pfund, Birch, Samuels & Gauthier
ATTORNEY

Patented Aug. 29, 1972 3,687,397

AKIRA SUZUKI INVENTORS
YOSHIAKI ESASHI
TSUNEMOTO NAKANISHI

BY Chittick, Pfund, Birch, Samuels & Gauthier ATTORNEY

AKIRA SUZUKI
YOSHIAKI ESASHI
TSUNEMOTO NAKANISHI
INVENTORS

BY Chittick, Pfund, Birch, Samuels & Gauthier
ATTORNEY

TAPE CONTROL APPARATUS OF TAPE PROCESSING MACHINES

BACKGROUND OF THE INVENTION

This invention relates to a magnetic tape machine or other tape processing machines such as a tape recorder, video tape recorder and the like and more particularly to apparatus for continuously and cyclically moving automatically a predetermined section of the tape selected arbitrarily.

The prior art apparatus which has been widely used as an auto-repeat or auto-reverse device requires some type of control elements to be associated with the tape. Thus, there have been used a number of methods such as fixing opposite ends of the tape to reels to utilize the tension of the tape, or applying an electroconductive foil to the tape which is to be detected or recording a signal of a particular frequency on the tape which is to be detected and so forth. However, according to these methods wherein some type of control element is applied on the tape, undesirable force or damage is applied to the tape to decrease its useful life. In addition it is difficult to vary the stop position of the tape thus causing the construction and operation to be complicated and expensive.

Further, as was disclosed in U.S. Pat. No. 3,032,285 an auto-repeat, auto-reverse system has been proposed wherein a pair of counters presettable to any values are associated with the tape driving mechanism so as to continuously repeat a selected section of the tape by the operation of these counters. Such a system can not be used in practice, however, unless a plurality of preselected positions on the tape are determined by a reference position so as to correlate with the counts of the counters. Since such a presettable mechanical counter is so constructed that it will display a zero and to simultaneously form an output signal when it reaches a preset value a pair of such counters are mounted so that they perform a subtraction operation as the tape is driven in the forward direction. For this reason it is not possible to expect that such counters act also as the above described integrating counters which are usually provided to indicate the length of movement of the tape.

In application, Ser. No. 756,911, filed Sept. 8, 1968 and assigned to the assignee of the present invention, a reset counter for automatic stop control is disclosed.

SUMMARY OF THE INVENTION

It is therefore a general object of this invention to provide a novel tape control apparatus according to which an integrating counter interlocked with the tape driving mechanism is utilized to readily control the tape at high reliability without providing a control element for the tape.

Further object of this invention is to provide an improved tape control apparatus wherein a pair of integrating counters are associated with the tape driving mechanism and wherein one of the counters functions to memorize the start position of the tape, and the other the rewinding position (reverse position) of the tape to form control signals near respective positions to continuously repeat the running of a selected tape section.

Still further object of this invention is to provide a tape control apparatus wherein by the operation of respective push buttons of a pair of integrating counters associated with the tape driving mechanism the counters are reset to a zero and memorize respective positions while at the same time the tape is driven in the forward or reverse direction so that the tape is driven over a section determined by said positions.

Yet another object of this invention is to provide a tape control apparatus capable of driving a tape section corresponding to a predetermined number of counts from any desired position on the tape and to continuously reciprocate the section without locating positions on the tape in accordance with the number of counts of the integrating counters.

According to one aspect of this invention there is provided a control apparatus for a tape processing machine comprising a first integrating counter presetable to zero and including a plurality of digit wheels, each having digits 0 through 9 inclusive, and a first switch contact operable when all of the digit wheels are shifted from 0 to 9; a resetable second integrating counter including a plurality of digit wheels, each having digits 0 through 9 inclusive, and a second switch contact operable when all of the digit wheels of the second counter are shifted from 9 to 0 or vice versa; means to interlock the first and second counters with the running of the tape to memorize a predetermined position of the tape by the reset operation of the counter; and a control circuit for the tape driving mechanism controlled by the first and second switch contacts.

According to another aspect of this invention there is provided an automatic stopping device of the rewinding operation of a tape comprising a zero resetable integrating counter interlocked with a tape driving mechanism to perform an addition operation when the tape is driven in the forward direction and to perform a subtraction operation when the tape is driven in the reverse direction and an electric contact member operable when the digit wheel of the highest order of the counter is shifted by one count from the zero count position in the subtraction direction whereby the start position of the tape is memorized in the counter by the zero reset operation thereof, the contact member forming a stop circuit of the tape driving mechanism.

BRIEF DESCRIPTION OF THE DRAWINGS

The invention can be more fully understood from the following detailed description taken in conjunction with the accompanying drawings in which.

DESCRIPTION OF THE PREFERRED EMBODIMENTS

Figure 1:
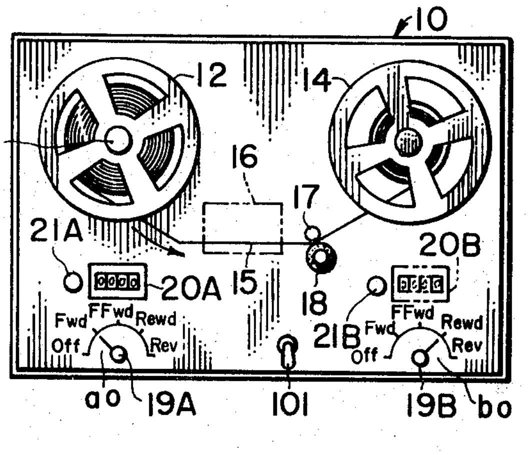
FIG.1 is a diagrammatic plan view of a tape recorder embodying this invention.
Figure 3:
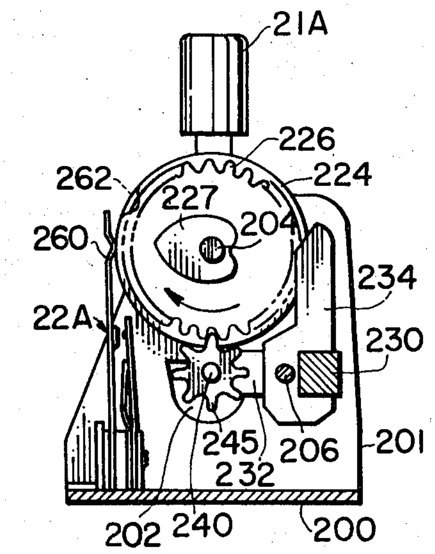
FIG.3 is a sectional view taken along a line III — III' in FIG.2.

A tape recorder 10 embodying this invention and shown in FIG.1 comprises a supply reel 12 and a take-up reel 14 between which a magnetic tape 15 is driven by a capstan 17 and a pinch roller 18 via a magnetic head 16. As is well known in the art an integrating counter 20A is driven by a belt and the like (not shown) passing around a driving shaft 120 of the supply reel 12 and the pulley 208 of counter 20. The counter 20 operates to effect an addition operation when the tape 15 is driven in the forward direction (as shown by an arrow) while to effect a subtraction operation while the direction of the movement of the tape is reversed thus indicating the relative position of the tape 15. Counter 20A is provided with a contact 22A (see FIG.3) which is arranged to be operated when the counter is rotated in the subtraction direction to display a count "9 9 9 9" starting from a count "0 0 0 0" as described later in detail. Push button 21A operates to reset counter 20A to zero. It is to be understood that the novel tape recorder 10 includes the other integrating counter 20B of the identical operation and construction as those of counter 20A. In FIG.1, only the zero reset push button 21B is exposed.

Further the tape recorder 10 is provided with set knobs 19A and 19B which can preset the next running condition of the tape near the respective zero reset operation positions of respective counters. As will be described hereinafter when these knobs 19A and 19B are rotated to align their pointers to positions displaying reproduction (Fwd), fast running (F.Fwd), rewinding (Rewd), etc., reverse reproduction contacts 22A and 22B of respective counters operate to short circuit operating push buttons of the tape recorder to establish a set running condition of the tape. When the operating switch 101 is brought to the OFF position the control apparatus of this invention is rendered inoperative so that the tape recorder can be used as a conventional one.

As has been pointed out hereinabove this invention is based on the unique utilization of the characteristics of the integrating counter. To have more clear understanding of this invention, the details thereof will first be considered with reference to FIGS. 2, 3 and 4. As shown, tow parallel shafts 204 and 206 are rotatably supported by the frame 200. On one shaft 204 are stepped slidably mounted gear 210 consisting of a worm gear 212 meshing a worm wheel 209 interlocked with a pulley 208 connected to a tape driving mechanism and a large gear integral with worm gear 212; and a required number of (four in the illustrated example) digit wheels 220, each formed with teeth 226 and a heart shaped cam 227 on one side and an order shift segment 228 on the other side. A C shaped lever 230 is mounted on the other shaft 206. Press members 234 urged against the peripheral surface of the heart shaped cam 227 of each digit wheel are connected in parallel to the base portion of lever 230 and a pinion shaft 240 with one end protruded into a notch 202 in one side plate 201 of the frame 241 is rotatably supported by both arms 232 of the lever 230. The shaft 240 supports a pinion 242 adapted to transmit the rotation of the large gear 214 to a unit digit wheel 221, a pinion 243 adapted to step by one digit a tenths digit wheel 222 in accordance with one revolution of the digit wheel 221, and pinions 244 and 245 adapted to rotate by one digit a hundredth digit wheel 223 and a thousandth digit wheel 224 in accordance with one revolution of the tenth digit wheel 222 and the hundredth digit wheel 223, respectively. The C shaped lever 230 is normally biased in the clockwise direction about its shaft 206 by the action of a spring 250 to cause respective pinions on shaft 240 to mesh large gear 214 and respective digit gears. Further, a zero reset push button 21A is provided which is free to move in the vertical direction to engage one end 241 of the shaft 240 protruding from the notch 202 in one side plate 201.

The above described construction of the integrating counter is well known in the art and its zero reset operation is performed by depressing push button 21A against the action of spring 250 so as to rotate C shaped lever 230 in the counter-clockwise direction about shaft 206 through the end 241 of shaft 240 engaged by the push button 21A. As a result, respective pinions 242, 243, 244 and 245 are caused to disengage large gears 214 and teeth 226 of respective digit wheels 220 and as the lever 230 is further rotated, press members 234 come to urge against the peripheral surfaces of respective heart shaped cams 227 thus resulting in the simultaneous rotation of all digit wheels to zero positions. With such an integrating counter when respective digit wheels are rotated in the addition direction until an integrated count "9 9 9 9" is displayed, and when the lowest or unit digit wheel 221 is further rotated by "one" count, then all digit wheels will be simultaneously brought back to their starting positions or a count "0 0 0 0". Conversely when the unit digit wheel 221 is rotated in the subtraction direction by one count from the count of "0 0 0 0", each digit wheel will be rotated by one digit to displace a count "9 9 9 9".

This invention is based on this operation. More particularly a leaf spring 260 is provided with the integrating counter 20A to normally urge against the peripheral surface of the digit wheel 224 of the highest order when the digit wheel 224 is in the state shown in the drawing to display "0" (read out position is above) and a depression 262 is formed on the peripheral surface of the digit wheel 224 at a position displaced from the contact position with spring 260 by one digit in the direction of rotation of addition (shown by an arrow in FIG.3). Further, a spring contact 22A is provided which is arranged to be closed when spring 260 engages depression 262 as the digit wheel 224 is rotated.

Figure 4:
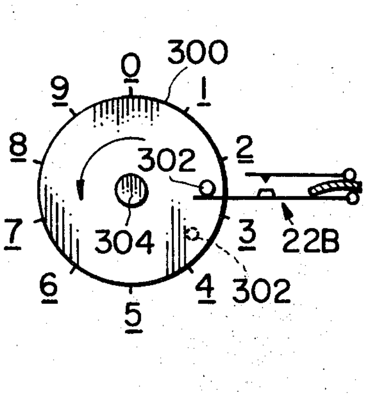
FIG.4 is a partial view of the other integrating counter employed in this invention.

As shown in FIG.4, the other integrating counter 20B is provided with a projection 302 on one side of its digit wheel 300 of the highest order and a directional contact 22B which is arranged not to be operated as the digit wheel 300 is rotated about shaft 304 in the subtraction direction (in the direction opposite to that indicated by the arrow) from the position shown in the drawing wherein the digit wheel 300 is displaying a count "0" to a position displaying a count "9" (when the projection 302 is moved from the solid line position to the dotted line position) whereas operated only when the digit wheel 300 is successively rotated (in the direction indicated by the arrow) to effect integration thus restoring its display from "9" to "0" (when projection 302 is moved from the dotted line position to the solid line position). In this manner, both contacts 22A and 22B are operated and restored by the rotation of integrating counters 20A and 20B, respectively.

Figure 5:
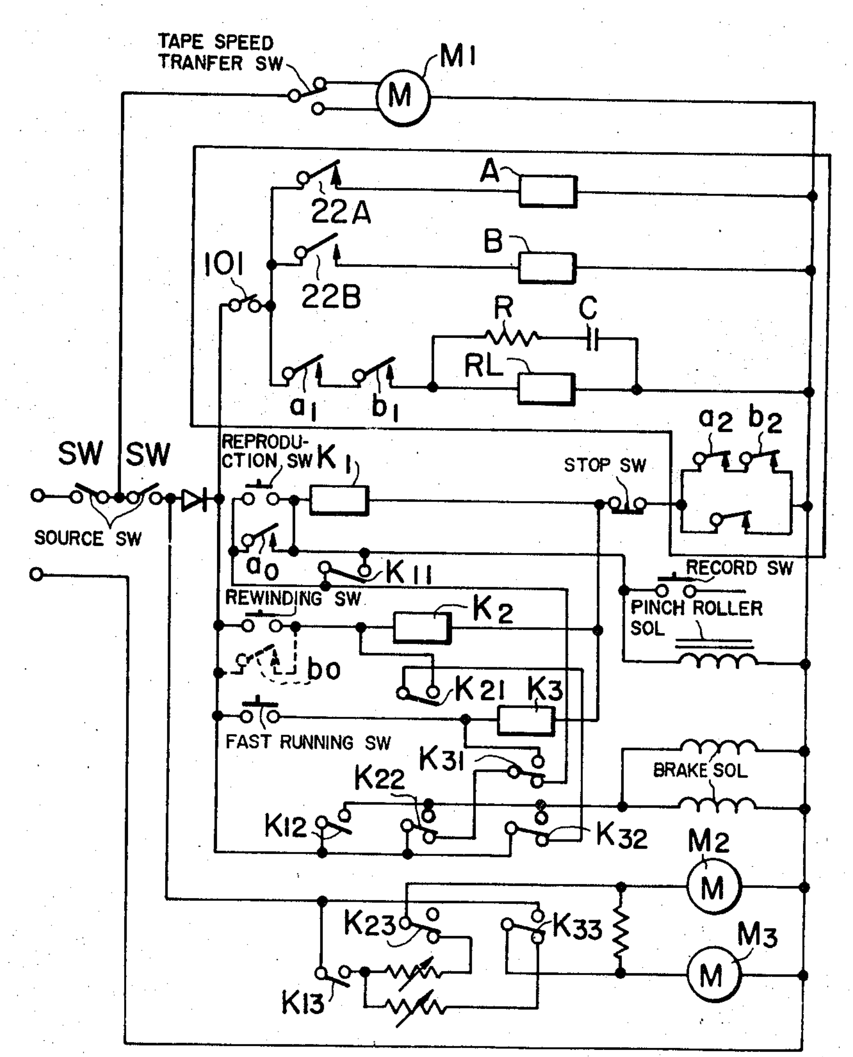
FIG.5 is a block diagram of this control apparatus as applied to a relay controlled three motor type tape recorder.

FIG.5 shows a block diagram of one embodiment of the novel control apparatus utilizing the above described contacts 22A and 22B. Since the construction of the circuit is identical to the basic control circuit of a conventional relay controlled three motor type tape recorder, except for the portions bounded by dot and dash lines the description thereof is not given except elements particularly related to this invention.

Relays $K_1$, $K_2$ and $K_3$ are provided for push buttons (push button switch circuits for reverse and reverse reproductions are not shown) for forward reproduction (Fwd), rewinding (Rewind) and fast forward running (F.Fwd), and a stop push button switch. A switch (Stop SW.) is connected in series with these push button switches which are connected in parallel. In parallel with these control circuits are connected relays A and B which are operated by contacts 22A and 22B of counters 20A and 20B respectively. A relay RL having a delay circuit is connected in series with normal close contacts $a_1$ and $b_1$ of these relays A and B. Further a normal close contact $r$ of relay RL is connected in parallel with a series circuit including normal close contacts $a_2$ and $b_2$ of relays A and B respectively and the parallel combination of contacts $r$, $a_2$ and $b_2$ is connected in series with the stop push button. As shown in FIG.1 transfer contacts $a_0$ and $b_0$ operated by relays A and B, respectively, are connected in parallel with each one of push buttons for reproduction, rewinding, fast driving and reverse by rotating knobs 19A and 19B, respectively.

Figure 6:
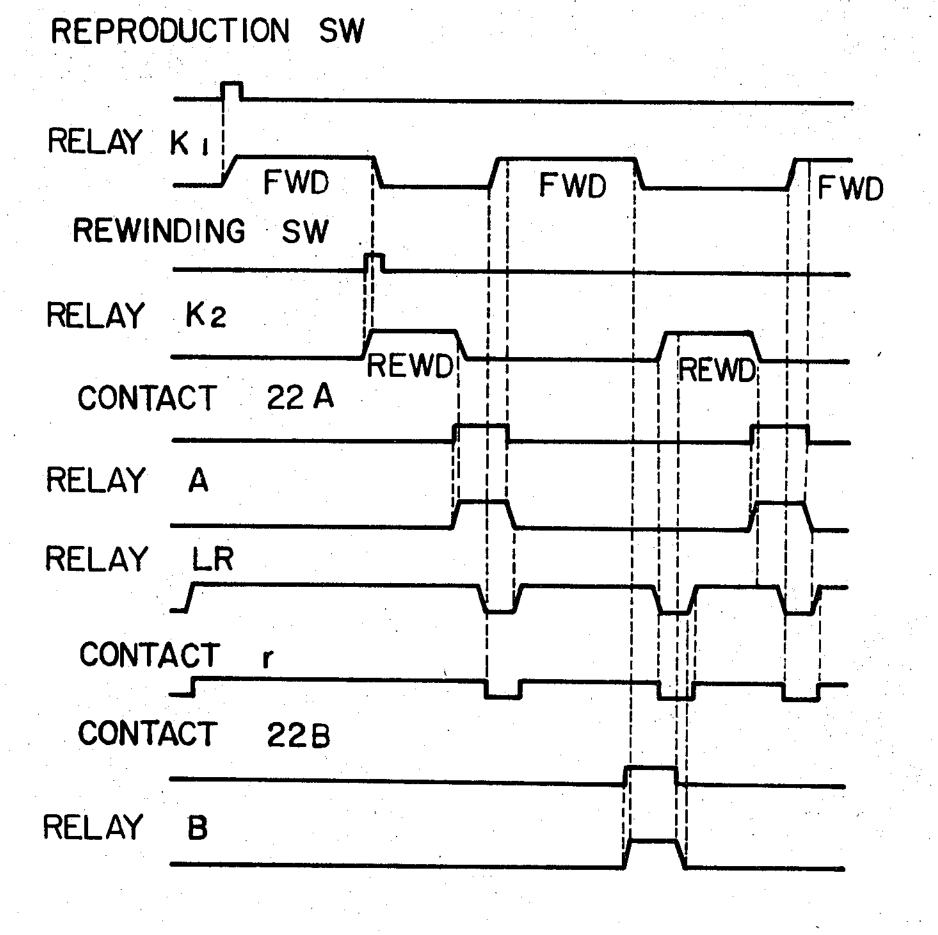
FIG.6 shows a time chart to explain the operation of the circuit shown in FIG.5 and FIGS. 7*a* and 7*b* show a construction of a digit wheel utilized in a conventional preset counter.

The operation of the control apparatus where it is desired to reproduce the tape in the forward direction from a particular position, then rewind the tape from any desired position and to repeatedly reproduce this section will be described hereunder with reference to the time chart shown in FIG.6 and to the following table.

TABLE

| Tape running condition and operation | Counter **20A** | Counter **20B** | Modification of counter **20B** counter **20B′** |
|---|---|---|---|
| (1) Start position | 0 0 0 0 | 0 0 0 0 | 0 0 0 0 |
| (2) Forward running | addition | addition | substraction |
| ↓ (play) | ↓ | ↓ | ↓ |
| (3) Rewinding position | 0 2 5 0 | 0 2 5 0 | 9 7 5 0 |
| (4) Operate push button of counter **20B** or **20B′** | 0 2 5 0 | 0 0 0 0 | 0 0 0 0 |
| (5) Reverse running | subtraction | subtraction | addition |
| ↓ (rewinding) | ↓ | ↓ | ↓ |
| (6) Start position | 0 0 0 0 | 9 7 5 0 | 0 2 5 0 |
| (7) Additional reverse running by one count | 9 9 9 9 | 9 7 4 9 | 0 2 5 1 |
| ↓ | (contact 22A operates) | | |
| (8) Forward running | addition | addition | subtraction |
| ↓ (play) | ↓ | 9 9 9 9 | ↓ |
| (9) Rewinding position | 0 2 5 0 | **align positions** 0 0 0 0 | 0 0 0 0 9 9 9 9 |
| ↓ | | (contact 22B operates) | (contact 22B′ operates) |
| (10) Reverse running | subtraction | subtraction | addition |
| ↓ (rewinding) | ↓ | ↓ | ↓ |
| (6) Start position Repeat step (7) and followings | 0 0 0 0 | 9 7 5 0 | 0 2 5 0 |

To perform this automatic repeating operation set knobs 19A and 19B shown in FIG.1 are rotated to align their pointers with Fwd and Rewd (rewinding) positions respectively. Then contacts $a_0$ and $b_0$ are connected in parallel with the reproduction push button and rewinding push button, respectively, as shown by dotted lines in FIG.5.

Before commencement of the reproduction of a desired section or program, push button 21A of one counter 20A is depressed to restore its count to zero. This zero reset operation causes to memorize the start position of this particular program or the start position of the tape in the counter 20A by the reason to be described later. Although the count of the other counter 20B may be any value, for the sake of understanding it is assumed that the counter 20B is also displaying a zero at this time just in the same manner as counter 20A. Then reproduction push button switch is depressed to energize its relay $K_1$ thus commencing the reproduction of the tape. As the tape is driven in the forward direction both counters 20A and 20B perform addition operation starting from zero. When it is assumed that the program terminates at a count "0 2 5 0" of the counters, then push button 21B of counter 20B is depressed to restore its count to zero. This means that the end position of the program or the rewinding position of the tape is memorized in the counter 20B by the reason to be described later. Thereafter, when the rewinding push button switch of counter 20B is depressed, its relay $K_2$ is energized to interrupt the circuit of said reproduction relay $K_1$ to drive the tape in the reverse direction. As a result, counter 20A effects subtraction operation from a count "0 2 5 0" whereas counter effects subtraction operation from a count "0 0 0 0" through a count "9 9 9 9". At this time contact 22B will not be operated as above described.

In this manner, when the program is rewound to its start position, the count of counter 20A is reset to "0 0 0 0" whereas counter 20B is brought to a count "9 7 5 0" by the subtraction of 250 counts. When the tape is further rewound by one count from this state counter 20A will be brought to a count "9 9 9 9". At this time, the leaf spring 260 urging against the peripheral surface of the digit wheel of the highest order 224 drops into depression 262 thereof to close contact 22A of counter 20A thus operating relay A. Consequently, contact $a_1$ of relay A is opened to open the circuit of relay RL which was energized by the closure of switch 101. However, as noted above relay RL is maintained in its energized state for a short interval determined by the time constant of the parallel circuit comprising C and R. As a consequence contact $a_2$ of relay A is opened while contact $r$ of relay RL is being opened so that the circuit of the rewinding relay $K_2$ is interrupted by the opening of the stop circuit, and the circuit of the reproduction relay $K_1$ will not be closed until contact $r$ is reclosed even when the transfer contact $a_0$ of relay A connected in parallel with the reproduction push button switch is operated. Concurrently with the reclosure of relay RL its contact $r$ and previously closed transfer contact $a_0$ establish the circuit of the reproduction relay $K_1$ to automatically drive the tape in the forward direction to reproduce again the program. Both counters 20A and 20B are driven in the direction of addition whereby the leaf spring 260 disengages depression 262 to restore contact 22A by the rotation of the digit wheel 224. As a result, relay A is deenergized to energize relay RL through its contact $a_1$. While contact r is being opened, the stop circuit will not be interrupted because contact $a_2$ of relay A has already been reclosed. In this manner, the tape is driven in the forward direction and counters 20A and 20B perform integration or addition operation. When the end position of the program is reached or counter reaches a position displaying a count "0 2 5 0" or the rewinding position counter 20B reaches a position to display a count "0 0 0 0" after passing through a count "9 9 9 9". At this time, as shown in FIG.4, projection 302 on one side of the digit wheel 300 of the highest order of counter 20B moves from the dotted line position to the solid line position in the direction of the arrow to close contact 22B. As a consequence, relay B is energized to open its contacts $b_1$ and $b'_2$ to interrupt circuits of relay RL and of the stop switch, respectively. After a short time the circuit of rewinding relay $K_2$ is established through transfer contact $b_0$ of relay B connected in parallel with the rewinding push button switch and contact *r* of relay RL which is now reclosed. As the tape is rewound from its rewinding position both counters are driven in the subtraction direction to open contact 22B of counter 20B by the rotation of its digit wheel of the highest order to deenergize relay B thus operating relay RL. In this manner, as the tape is brought back to the record start position of this program or the start position and as the tape is further driven in the reverse direction by one count, the contact 22A of counter 20A is closed whereby the above cycle of operation is repeated automatically.

Where it is desired to perform repeated operation of the forward reproduction and reverse reproduction, the knobs 19A and 19B shown in FIG.1 are rotated to align their pointers with Fwd and Rev. positions respectively. Then transfer contacts $a_0$ and $b_0$ are connected in parallel with the reproduction push button switch and the reverse reproduction push button switch (not shown) respectively. Then by operating respective reset push button switches of both counters 20A and 20B at the commencement and termination of the forward reproduction these positions are memorized in respective counters to perform the automatic repeating operation in the same manner as above described.

The operation of counter 20B' which is a modified embodiment of counter 20B and is shown to the right of the column of counter 20B in the above described table will now be described. Although not shown in the drawing, this modified counter 20B' has a construction similar to counter 20A and includes a zero reset means but is different from counter 20B in that the operation of its contact 22B' (not shown) actuated by the digit wheel of the highest order is not directional. However, counter 20B' operates in the reverse manner as counter 20A with regard to the running of the tape. More particularly counter 20B' performs substraction operation when the tape is driven in the forward direction put performs addition operation for the reverse running of the tape. In such a case, if both counters display a count "0 0 0 0" at the tape start position, then counter 20B' will at once display a count "9 9 9 9" to operate contact 22B' thereof. Such problem can be avoided, however, by holding the source switch 101 in its opened state until the rewinding position is reached or until a predetermined section is selected on the tape by the zero reset operation of the pair of counters. Utilization of such a modified counter enables mass production of counter 20A as well as the direct indication of the length of the tape running or relative position thereof with respect to reverse running of the tape. Since the operation of the modified counter 20B' is similar to that of counter 20B, it will be clearly understood from the above described table.

In this manner, any desired combined operation is possible by the selective operation of set knobs 19A and 19B. More particularly, when one set knob, for example, knob 19B is set to the OFF state (that is not connected to the circuit of any push button switch in any operation mode) while only the other knob 19A is set to the Fwd position, to rewind the tape it is required to manually operate the rewinding push button. However when the tape is restored to the start position and when it is rewound by one additional count, the contact 22A of counter 20A is opened to automatically stop rewinding operation. Thereafter contacts $a_0$ and *r* of relay A energize reproduction relay $K_1$ to automatically switch to the forward reproduction operation thus repeating the operation semiautomatically. Further, with both set knobs 19A and 19B set in their off positions respective operation modes performed manually are stopped automatically by the operation of respective counters 20A and 20B.

Figure 2:
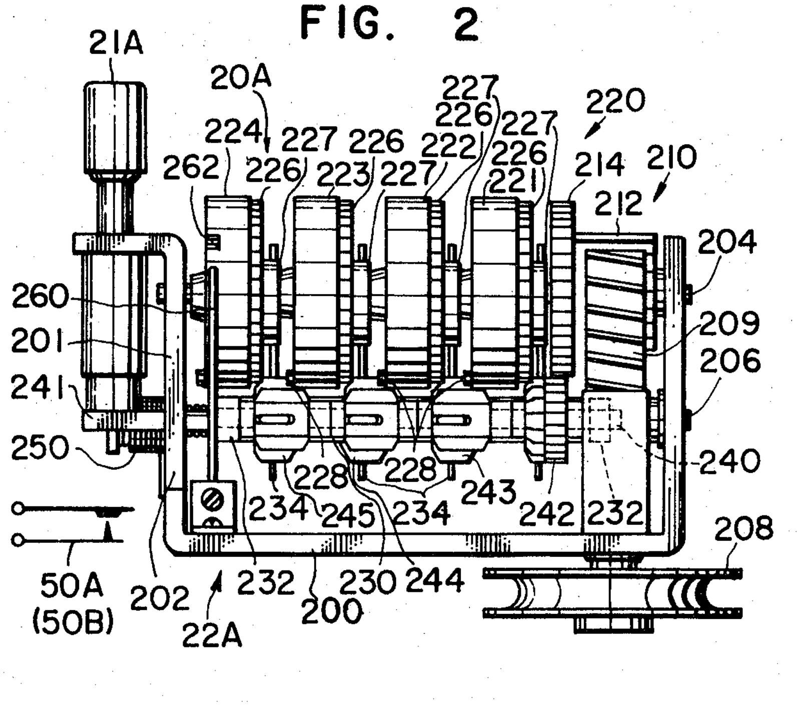
FIG.2 is a side elevation of one example of one integrating counter employed in this invention.

As shown in FIG.2, an additional contact 50A may be provided for the embodiment described above which is arranged to be closed when push button 21A is depressed or counter 20A is reset to zero and connected in parallel with the reproduction push button switch. This modification enables counter 20A to memorize the start position of a particular program and to operate reproduction relay $K_1$ by mere operation of the push button 21A.

Similarly, a contact 50B (not shown) may be provided for the other counter 20B which is operated by its push button 21B. When contact 50B is connected in parallel with the rewinding or reverse (reverse reproduction) push button switch, by the zero reset operation of the counter 20B it is possible to memorize the rewinding position of a particular program in the counter and to perform rewinding ro reverse reproduction operation of the tape. Provision of such contacts 50 and 50B for counters 20A and 20B enables to operate and manipulate the tape recorder 10 in the same manner as those of conventional tape recorders.

Figure 7A:
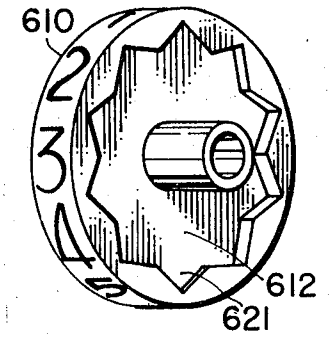
Figure 7B:
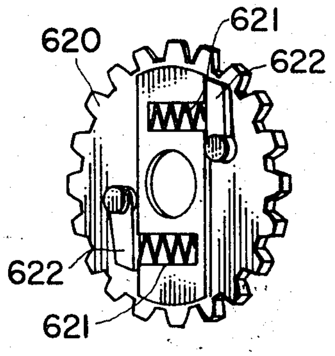

Alternatively, instead of using counter 20B a so-called preset counter capable of presetting any desired numerical value may be employed to perform perfect continuous automatic repeating operation. As shown in FIG.7, a digit wheel 60 of the preset counter generally comprises a main body of the digit wheel 610 (FIG.7A) having digits on its periphery and a gear 620 (FIG.7B) meshing with respective pinions 242, 243, 244 and 245, said main body 610 and gear 620 being interconnected by means of star shaped depression 612 on one side of the main body 610 and a pair of pawls 622 provided on one side of gear 620 and urged to engage the depression 612 by means of springs 621. Accordingly, even when gear 620 is held stationary by being meshed with pinions, it is possible to manually rotate the main body against the action of springs 621 thus setting any numerical value.

When use is made of such a preset counter provided with contact 22B described above in connection with counter 20B and a counter 20A with a contact 50A which is operated at the time of the zero reset operation, when the operator knows that the quantity of a program to be reproduced is equal to "250" counts he will set the count of the preset counter to a count "9 7 5 0" which is lesser than a count "0 0 0 0" by 250 counts and then depress push button 21A of counter 20A to reset it to zero to store therein the start position of the program. Concurrently therewith the reproduction relay $K_1$ is operated by contact 50A connected in parallel with the reproduction push button switch. As the tape is driven in the forward direction to perform reproduction of the program, counter 20A performs an addition operation starting from zero whereas the preset counter performs an addition operation starting from a count "9 7 5 0". In this manner, when the tape has driven by a predetermined quantity corresponding to the program of 250 counts the preset counter will be brought to the count "0 0 0 0" through count "9 9 9 9". At this time, the contact of the preset counter is operated so that if the transfer contact $b_0$ of preset knob 19B interlocked therewith were aligned to Rewd position transfer contact $b_0$ and contact *r* or relay RL cooperate to operate rewinding relay $K_2$ to rewind the tape. Consequently, counter 20A performs a subtraction operation from its count "0 2 5 0" whereas the preset counter from the count "0 0 0 0". Thus, when the tape is rewound to the start position the count of counter 20A becomes zero and as the tape is further rewound by one count, the contact 22A of counter 20A will be operated. Thus, the operator is required to merely preset the quantity of the program which he desires to reproduce in the preset counter to provide full automatic and cotinuous repeating operations by the operation of the push button of counter 20A.

As has been described in detail, according to this invention, a desired position of a tape is memorized in a counter interlocked with a tape driving mechanism by the reset operation of the counter, and a control circuit for the tape recorder is controlled by a contact arranged to be operated at a time when the count of the counter is displaced from the reset position by substantially one count. Thus, it is not necessary to provide a control element for the tape as in the prior art. Further, even when the push button of the counter is depressed inadvertently or by any other reason there is no adverse effect upon the tape driving mechanism excepting interruption of the drive of respective digit wheels. In addition, not only any one of all desirable modes of automatic control is possible but also the operation and manipulation of the control are very simple.

While the invention has been shown and described in terms of a relay controlled three motor type tape recorder it is to be understood that this invention is not limited to this particular application and that the invention may equally be applicable to a mechanically controlled one motor type tape recorder or tape processing machines of other types.

Further, although contacts 22A and 22B of counters 20A and 20B were shown as the spring biased type, the invention is not limited to this type of contact and many other types of contacts may be employed including cam operated contact, printed slide contacts and contactless contacts such as reed switches disposed to oppose permanent magnets embedded in the digit wheels. It is only essential to use contact members which are constructed to close switches or form control signal whenever the digit wheel of the highest order is displaced from the reset position by substantially one digit.

What is claimed is:

1. Control apparatus for a tape processing machine having a tape driving mechanism comprising a first integrating counter resetable to zero and including a plurality of digit wheels, each one of said digit wheels having digits 0 through 9 inclusive, and a first switch contact operable when all of said digit wheels are shifted from 0 to 9; a resetable second integrating counter including a plurality of digit wheels each of which having digits 0 through 9 inclusive, and a second switch contact operable when all of said digit wheels of said second counter are shifted from 9 to 0 or vice versa; means to interlock said first and second counters with the running of the tape of said tape processing machine to memorize predetermined positions of said tape by the reset operation of said counters; and a control circuit for said tape driving mechanism controlled by said first and second switch contacts.

2. The control apparatus according to claim 1 wherein said first counter further comprises a third switch contact interlocked with the zero reset operation so that the tape is automatically started to run in the forward direction by the operation of said third switch contact in response to the zero reset operation of said first counter.

3. The control apparatus according to claim 1 wherein said second counter further comprises a forth switch contact so that the tape is automatically started to run in the reverse direction by the operation of said fourth switch contact in response to the reset operation of said second counter.

4. The control apparatus according to claim 1 wherein said first counter includes a third switch contact adapted to start said tape in the forward direction in response to the zero reset operation of said first counter and wherein said second counter comprises a forth switch contact adapted to start said tape in the reverse direction in response to the reset operation of said second counter.

5. A control apparatus for a tape processing machine having a tape driving mechanism comprising an integrating counter resetable to zero and including a plurality of digit wheels each having digits 0 through 9 inclusive, and a first switch contact operable when all of said digit wheels are shifted from 0 to 9; a preset counter capable of presetting a desired quantity of tape running, said preset counter including a plurality of digit wheels each having digits 0 through 9 inclusive, and a second switch operable when all of said digit wheels of said preset counter are shifted from 9 to 0 or vice versa; means to interlock said integrating counter and said preset counter with the running of said tape to memorize the start position of said tape in said integrating counter in response to the reset operation of said integrating counter; and a control circuit for the tape driving mechanism controlled by said first and second switch contacts.

6. A control apparatus for a tape processing machine having a tape driving mechanism comprising a zero resetable integrating counter including a plurality of digit wheels each having digits 0 through 9 inclusive, a switch contact operable when all of said digit wheels are shifted from 0 to 9, and a third switch contact interlocked with the zero reset operation of said integrating counter; a preset counter capable of presetting a desired quantity of tape running, said preset counter including a plurality of digit wheels each having digits 0 through 9 inclusive, and a second contact operable when all of said digit wheels of said preset counter are shifted from 9 to 0 or vice versa; means to interlock said integrating counter and said preset counter with the running of said tape to memorize a predetermined position of said tape in said integrating counter in response to the zero reset operation thereof; and a control circuit for the tape driving mechanism controlled by said first, second and third contacts.

* * * * *

PO-1050
(5/69)

UNITED STATES PATENT OFFICE
CERTIFICATE OF CORRECTION

Patent No. 3,687,397 Dated August 29, 1972

Inventor(s) Akira Suzuki, Yoshiaki Esashi and Tsunemoto Nakanishi

It is certified that error appears in the above-identified patent and that said Letters Patent are hereby corrected as shown below:

After "[72]Inventors: Akira Suzuki; Yoshiaki Esashi, both of Tokyo; Tsunemoto Nakanishi, Ichikawa, all of Japan" insert -- [73] Assignee: Tamura Electric Works, Limited, Tokyo, Japan --;

Column 2, line 57, change"III-III'"to -- III-III --;

Column 3, line 47, "tow" should be -- two --;
line 67, "tenths" should be -- tenth --;

Column 4, line 39, "with" should be -- for --;

Column 7, line 61, "put" should be -- but --; and

Column 8, line 48, "ro" should be -- or --.

Signed and sealed this 15th day of May 1973.

(SEAL)
Attest:

EDWARD M.FLETCHER,JR.
Attesting Officer

ROBERT GOTTSCHALK
Commissioner of Patents